United States Patent
Reddy et al.

(10) Patent No.: US 9,803,063 B2
(45) Date of Patent: Oct. 31, 2017

(54) BLUE INORGANIC COLOURANTS/PIGMENTS AND PROCESS FOR PREPARATION THEREOF

(71) Applicant: Council of Scientific & Industrial Research, New Delhi (IN)

(72) Inventors: Mundlapudi Lakshmipathi Reddy, Thiruvananthapuram (IN); Sheethu Jose, Thiruvananthapuram (IN)

(73) Assignee: Council of Scientific & Industrial Research, New Delhi (IN)

( * ) Notice: Subject to any disclaimer, the term of this patent is extended or adjusted under 35 U.S.C. 154(b) by 277 days.

(21) Appl. No.: 14/421,919

(22) PCT Filed: May 2, 2013

(86) PCT No.: PCT/IN2013/000292
§ 371 (c)(1),
(2) Date: Feb. 16, 2015

(87) PCT Pub. No.: WO2014/033726
PCT Pub. Date: Mar. 6, 2014

(65) Prior Publication Data
US 2015/0218340 A1     Aug. 6, 2015

(30) Foreign Application Priority Data

Aug. 30, 2012   (IN) ............... 2686/DEL/2012

(51) Int. Cl.
| | |
|---|---|
| C09C 1/02 | (2006.01) |
| C08K 3/36 | (2006.01) |
| C09C 1/28 | (2006.01) |
| C09D 5/33 | (2006.01) |
| C09D 7/12 | (2006.01) |
| C01G 3/00 | (2006.01) |
| C08K 3/22 | (2006.01) |
| C08K 3/26 | (2006.01) |
| C09D 133/12 | (2006.01) |
| C04B 103/54 | (2006.01) |

(52) U.S. Cl.
CPC ............ *C08K 3/36* (2013.01); *C01G 3/006* (2013.01); *C08K 3/22* (2013.01); *C08K 3/26* (2013.01); *C09C 1/28* (2013.01); *C09D 5/004* (2013.01); *C09D 7/1216* (2013.01); *C09D 133/12* (2013.01); *C01P 2002/72* (2013.01); *C01P 2002/84* (2013.01); *C01P 2004/61* (2013.01); *C01P 2006/32* (2013.01); *C01P 2006/60* (2013.01); *C01P 2006/62* (2013.01); *C01P 2006/63* (2013.01); *C01P 2006/64* (2013.01); *C04B 2103/54* (2013.01); *C08K 2003/221* (2013.01); *C08K 2003/262* (2013.01); *C08K 2003/265* (2013.01)

(58) Field of Classification Search
USPC ............... 106/466; 427/385.5, 383.6
See application file for complete search history.

(56) References Cited

U.S. PATENT DOCUMENTS 5,888,291 A * 3/1999 Chopin .................. A61K 8/25
106/444

OTHER PUBLICATIONS

International Preliminary Report on Patentability, PCT/IN2013/000292, Council of Scientific & Industrial Research, Aug. 22, 2014.
International Search Report and the Written Opinion of the International Searching Authority, PCT/IN2013/000292, Council of Scientific & Industrial Research, Sep. 17, 2013.
Manu, K.M. et al., Low permittivity SrCuSi4O10-LMZBS glass composite for LTCC applications, Materials Letters 65 (2011) pp. 565-567.
Chakoumakos, Bryan C. et al., Refinement of the Structures of the Layer Silicates MCuSi4O10 (M= Ca, Sr, Ba) by Rietveld Analysis of Neutron Powder Diffraction Data, Journal of Solid State Chemistry 103, pp. 105-113 (1993).
Pabst, A., Structures of Some Tetragonal Sheet Silicates, Acta Cryst. (1959), 12, pp. 733-739.
Hughes, Eric M., Preparation and structural characterisation of alkaline earth sheet silicates containing copper by powder neutron diffraction, EXAFS and UV-visible spectroscopy, Anales de Quimica Int. Ed. (1997) 93:233-236.
Levinson, Ronnen et al., Methods of creating solar-reflective non-white surfaces and their application to residential roofing materials, Solar Energy Materials & Solar Cells 91, (2007), pp. 304-314.

* cited by examiner

*Primary Examiner* — Monique Peets
(74) *Attorney, Agent, or Firm* — McDonald Hopkins LLC (57) ABSTRACT

Nontoxic Near infra-red Reflecting (NIR) inorganic pigments, characteristically blue and well suited for the coloration of a wide variety of substrates, for example, plastics and concrete building roofing material, etc., comprise mixed metal silicate having the general formula: $La_xSr_{1-x}Cu_{1-y}Li_ySi_4O_{10}$, where x is equal to 0 to 0.5 and y is equal to 0 to 0.5. These silicates with tetragonal crystal structure are prepared by calcination method in air atmosphere.

9 Claims, 6 Drawing Sheets

BLUE INORGANIC COLOURANTS/PIGMENTS AND PROCESS FOR PREPARATION THEREOF

FIELD OF THE INVENTION

The present invention relates to blue inorganic pigments, based on silicate of lanthanum, strontium, copper and lithium, exhibiting, on the one hand very good chromatic characteristics, in particular a remarkable blue colour with high near infra-red reflectance and, on the other hand, the advantage of an absence of toxic metal in the pigments.

This invention also relates to a process for the preparation of such pigments and to the use thereof for the colouration of a variety of substrates.

BACKGROUND OF INVENTION

Currently used blue pigments are Cobalt blue ($CoAl_2O_4$), ultramarine ($Na_7Al_6Si_6O_{24}S_3$), Prussian blue ($Fe_4[Fe(CN)_6]_3$), and Azurite $[Cu_3(CO_3)_2(OH)_2]$. All suffer from environmental and/or durability issues: Cobalt is considered to be highly toxic. Ultramarine and azurite are not stable with respect to heat and acidic conditions. Prussian blue liberates HCN under mild acidic conditions. In addition, the manufacture of ultramarine involves a large amount of $SO_2$ emission. Hence, the identification of intense blue inorganic pigments that are environmentally benign, earth-abundant, and durable is important but remains a challenge today.

Barium and copper silicates, especially of blue or violet colour, are furthermore known, however the preparation of these products presents some difficulties. In fact, these silicates are generally obtained by grog firing. In such cases, because of the high temperatures required for the preparation, melt phases are necessarily involved as intermediates and as a result products are obtained essentially in the form of glasses [Reference may be made to Andrew E. Smith et al. J. Am. Chem. Soc. 2009, 131, 17084-17086].

Reference may be made to U.S. Pat. No. 5,888,291, wherein, the inventors have claimed a process for the preparation of blue/violet inorganic pigments based on barium, copper and titanium silicates, represented by the formulae: $BaCuSi_4O_{10}$, $BaCuSi_2O_6$ and $BaCuTiSi_3O_9$, wherein said silicate comprises agglomerate with an average particle size of no greater than 20 micrometers. These silicates are prepared by a process including the following stages: a silica sol or silicate and optionally a titanium sol is mixed with sols of the other constituent elements of the silicate with the exception of oxygen; the mixtures thus obtained is dried, preferably by spraying, and the product thus obtained is calcined. This patent also discloses a process for the preparation of a series of rare earth doped pigments, especially lanthanum and neodymium having the formulae: $Ba_{0.5}La_{0.5}Cu_{0.5}Na_{0.5}Si_4O_{10}$, $Ba_{0.5}Nd_{0.5}Cu_{0.5}Si_2O_6$ and $Ba_{0.5}La_{0.5}Cu_{0.5}Na_{0.5}Si_2O_6$, well suited for colouration of plastics, paints, varnishes, rubbers, ceramics, glasses, inks, cosmetic products and dyes. However, the pigment powder silicates obtained contains mixture of phases. The main drawbacks with these pigment powders is that they are not stable and light-green colours were observed when they were immersed in the unleaded commercial transparent glaze. Most importantly, the colour coordinates obtained are not very attractive [$Ba_{0.5}La_{0.5}Cu_{0.5}Na_{0.5}Si_4O_{10}$: L*=58.0, a*=5.0, b*=−43.0] as compared to present invention [$La_{0.3}Sr_{0.7}Cu_{0.7}Li_{0.3}Si_4O_{10}$, L*=49.59, a*=10.41, b*=−51.74].

Solid solutions of $CaCuSi_4O_{10}$, $BaCuSi_4O_{10}$ and $SrCuSi_4O_{10}$ have been successfully synthesized from stoichiometric mixtures of silica, alkaline-earth metal carbonates and copper carbonate at high temperature using solid state reactions by Kendrick and co-workers [Reference may be made to E. Kendrick, C. J. Kirk, S. E. Dann, Dyes and Pigments 73 (2007) 13-18]. UV-vis spectra and colour coordinate data were collected on the materials to correlate the changes in the structure with the observed colour properties. A concomitant reduction in lightness indicating potential weakening of the tinting capability is observed as the cell parameters lengthen. Prolonged exposure to natural light has a deleterious effect on the colour of these synthetic materials in a similar way to the natural minerals. Further, the blue of the pigment is not very attractive.

Mixed oxides such as $Ba_{0.5}La_{0.5}Na_{0.5}Cu_{0.5}Si_4O_{10}$ and $Ba_{0.5}La_{0.5}Na_{0.5}Cu_{0.5}Si_2O_6$ produced vivid blue and violet-blue colour powders, respectively when calcined between 950° C. and 1050° C. for different soaking times. X-ray diffraction patterns for $Ba_{0.5}La_{0.5}Na_{0.5}Cu_{0.5}Si_4O_{10}$ showed the presence of the phases which included (a) $BaCuSi_4O_{10}$ (b) $La_2Si_2O_7$ (c) $SiO_2$ and $La_2O_3$ (trace) whereas $Ba_{0.5}La_{0.5}Na_{0.5}Cu_{0.5}Si_2O_6$ confirmed the presence of the phases such as (a) $BaCuSi_4O_{10}$ and (b) $BaCuSi_2O_6$. These pigment powders were also not stable and light-green colours were observed when they were immersed in the unleaded commercial transparent glaze [Reference may be made to: Jitendra Kumar Kar, Ron Stevens, Christopher R. Bowen, Journal of Alloys and Compounds 461 (2008) 77-84]. Further, the colour coordinates are not very attractive [L*=65.58, a*=1.92, b*=−38.01] as compared to present invention [$La_{0.3}Sr_{0.7}Cu_{0.7}Li_{0.3}Si_4O_{10}$, L*=49.59, a*=10.41, b*=−51.74].

In order to obviate the drawbacks associated with the existing blue pigments, the present invention reports a phase pure silicate with impressive chromatic characteristics, in particular a remarkable blue colour with high near infra-red reflectance.

OBJECTS OF THE INVENTION

The main object of the present invention is to provide blue inorganic pigments with impressive chromatic characteristics, in particular a remarkable blue colour with high near infra-red reflectance.

Another object of the invention is to provide pigments containing non-toxic elements, thermally and chemically stable and which are well suited for colouration of many materials and substrates.

Another object of the invention is to provide pigments with single crystalline phase.

Further object of the invention is to provide a process for preparation of inorganic pigments.

One more object of the invention is to provide a process for using the pigments for colouration of the substrate.

SUMMARY OF INVENTION

Accordingly, the present invention provides a blue inorganic pigment represented by the general formula $La_xSr_{1-x}Cu_{1-y}Li_ySi_4O_{10}$ wherein x is equal to 0.0 to 0.5 and y is equal to 0.0 to 0.5.

In an embodiment of the invention, representative pigment is represented by following chromaticity coordinates as per the CIE L*a*b* colour system:

a. $SrCuSi_4O_{10}$, L*=71.15, a*=−5.70, b*=−23.86;
b. $La_{0.1}Sr_{0.9}Cu_{0.9}Li_{0.1}Si_4O_{10}$, L*=55.71, a*=5.74, b*=−47.82;
c. $La_{0.2}Sr_{0.8}Cu_{0.8}Li_{0.2}Si_4O_{10}$ L*=50.62, a*=9.23, b*=−51.47;
d. $La_{0.3}Sr_{0.7}Cu_{0.7}Li_{0.3}Si_4O_{10}$, L*=49.59, a*=10.41, b*=−51.74;
e. $La_{0.4}Sr_{0.6}Cu_{0.6}Li_{0.4}Si_4O_{10}$, L*=52.99, a*=4.12, b*=−45.17;
f. $La_{0.5}Sr_{0.5}Cu_{0.5}Li_{0.5}Si_4O_{10}$, L*=55.64, a*=1.53, b*=−39.47;

In another embodiment of the invention, the pigment comprises an average particle size of 2 to 6 micrometers.

In another embodiment of the invention, the pigment is composed of mainly phase pure crystalline compounds In another embodiment of the invention, the pigment is useful as a colourant for substrate materials selected from the group consisting of cement slabs, concrete slabs, roofing materials, plastics, paints and other polymers.

In another embodiment of the invention, the pigment exhibits near infra-red reflectance in the range of 75 to 77% at 1100 nm wavelength which is higher in comparison with visible reflectance in the range of 40 to 60% at 725 nm wavelength Another embodiment of the invention provides a process for preparing a blue inorganic pigment represented by the general formula $La_xSr_{1-x}Cu_{1-y}Li_ySi_4O_{10}$ wherein x is equal to 0.0 to 0.5 and y is equal to 0.0 to 0.5, comprising the steps of:
  (i) mixing one part of stoichiometric mixture of lanthanum oxide and strontium carbonate in a stoichiometric ratio of x:1−x, one part of stoichiometric mixture of copper oxide and lithium carbonate in a stoichiometric ratio of 1−y:y and four parts of silicon dioxide together to obtain a solid mixture;
  (ii) calcining the solid mixture obtained in step (i) to obtain the blue inorganic pigment.

In yet another embodiment of the invention, calcination in step (ii) is done at a temperature in the range of 950°-1000° C. in air atmosphere for a period ranging between 16 to 20 h.

Another embodiment of the invention provides a process for colouring a polymer substrate using the pigments as claimed in claim 1, comprising the steps of adding 5 to 10% by weight of the pigment to 90-95% of the polymer substrate dispersed in a cold curing liquid, sonicating for 10-15 min and drying at a temperature ranging between 28-35° C. followed by compressing the resultant paste uniaxially into desired shapes at a pressure ranging between 25 to 30 MPa.

In still another embodiment of the invention, the polymer substrate used is poly methyl methacrylate.

Yet another embodiment of the invention provides a process for coating of a building roofing material comprising the steps of:
  (i) pre-coating the building roofing material with white pigment TiO2,
  (ii) preparing an emulsion of the pigment as claimed in claim 1 by mixing the pigment with a binder in a dispersion medium;
  (iii) coating the building roofing material of step (i) with the emulsion prepared in step (ii) and drying the coated slab at a temperature ranging between 28-35° C. to obtain a coated building roofing material.

In another embodiment of the invention, the building roofing material is a cement slab or a concrete slab.

In another embodiment of the invention, the pigment to binder ratio in step (ii) is 1:1.

In another embodiment of the invention, the binder is cold cure polymer resin powder.

In another embodiment of the invention, the dispersion medium is a cold curing liquid.

In another embodiment of the invention, the coated building roofing material obtained in step (iii) has a coating thickness in the range of 150 to 180 micrometer.

In another embodiment of the invention, the coated building roofing material obtained in step (iii) exhibits 78% reflectance at 1100 nm.

DETAILED DESCRIPTION OF THE INVENTION

The present invention provides a novel class of inorganic pigments, in particular of blue colour which has higher near infra-red reflectance, containing non-toxic elements, thermally and chemically stable and which are well suited for colouration of many materials and substrates.

This invention relates to a series of inorganic pigments based on phase-pure silicate that can be represented by the formula $La_xSr_{1-x}Cu_{1-y}Li_ySi_4O_{10}$, where x ranges from 0 to 0.5 and y ranges from 0 to 0.5. The invention also covers coloured pigments, especially of blue colour, based on silicates of the above mentioned type prepared by calcination methods in air atmosphere. These colourants can be used to form coloured objects or coatings through their use in applications such as paints, plastics, ceramics, glasses and the like.

In accordance with another aspect of the present invention, $La_xSr_{1-x}Cu_{1-y}Li_ySi_4O_{10}$, where x ranges from 0 to 0.5 and y ranges from 0 to 0.5) pigments provide high near infra-red reflectance. Such high near infra-red reflectance may result in substantially less heat build up in coloured objects, especially for green house effect.

The present invention discloses a process for the synthesis of mixed metal silicate with good chromatic property; especially blue component is twenty five units higher than the solid solutions of $CaCuSi_4O_{10}$, $BaCuSi_4O_{10}$ and $SrCuSi_4O_{10}$.

The present invention discloses a process for the synthesis of mixed metal silicate with good chromatic property; especially blue component is thirteen units higher than the solid solutions of $Ba_{0.5}La_{0.5}Na_{0.5}Cu_{0.5}Si_4O_{10}$ and $Ba_{0.5}La_{0.5}Na_{0.5}Cu_{0.5}Si_2O_6$. Moreover, the current invention gives single crystalline phase.

These and other aspects of the present invention will be more apparent from the following description.

The blue coloured inorganic pigments having formula $La_xSr_{1-x}Cu_{1-y}Li_ySi_4O_{10}$, (where x ranges from 0 to 0.5 and y ranges from 0 to 0.5) comprise of a tetragonal crystal structure. Inorganic pigments according to the invention are formed by mixing stoichiometric amounts of high purity $La_2O_3$, $SrCO_3$, CuO, $Li_2CO_3$ and $SiO_2$; ball milled and calcined at a temperature range 950-1000° C. for 16-20 h in air. The well ground calcined powders were used for the characterization of pigments.

The phase purity of the synthesized powder pigments were examined by means of X-ray powder diffraction (XRD) using Ni filtered CuKα1 radiation with a Philips X'pert Pro diffractometer. The particle size distribution of the pigment was investigated in water as a medium and calgon as the dispersing agent measured by the Laser Scattering Particle Size distribution Analyzer (CILAS 930 Liquid). Morphological analysis was performed by means of Scanning Electron Microscope with a JEOL JSM-5600LV SEM. The thermal stability of the colourant was checked in the temperature range of 50-1000° C. by SII Nanotechnology Inc., TG/DTA 6200 in nitrogen atmosphere.

The diffuse reflectance of the powder was measured with UV-vis spectrophotometer (Shimadzu, UV-3600 with an integrating sphere attachment) using barium sulphate as a reference. The colour coordinate values are measured on the CIE (Commission Internationale de l'Eclairage) scale, represented by L* a* b*. The values a* (the axis red-green) and b* (the axis yellow-blue) indicate the colour hue. The value L* represents the lightness or darkness of the colour as related to a neutral grey scale. The near-infra-red reflectance spectra of the powdered pigment samples were recorded with a UV-vis-NIR spectrophotometer (Shimadzu, UV-3600 with an integrating sphere attachment) using poly-tetrafluoroethylene (PTFE) as a reference. Optical measurements were carried out in the 700 to 2500 nm range.

The thickness of the pigment coating on concrete cement slab was measured employing LEICA DMRX optical microscope.

Following examples are given by way of illustrations and should not be construed so as to limit the scope of the invention.

Example 1

This example illustrates the preparation of $SrCuSi_4O_{10}$.

1.48 g of strontium carbonate [$SrCO_3$; M=147.63], 0.80 g of copper oxide [CuO; M=79.54], and 2.41 g of silicon dioxide [$SiO_2$; M=60.14] were thoroughly mixed in the stoichiometric ratio in an agate mortar with a pestle. The mixture was calcined at 950° C. for 16 h in air atmosphere. The calcined mass was then grinded with mortar and pestle to reduce the particle size of the pigment.

Figure 1:
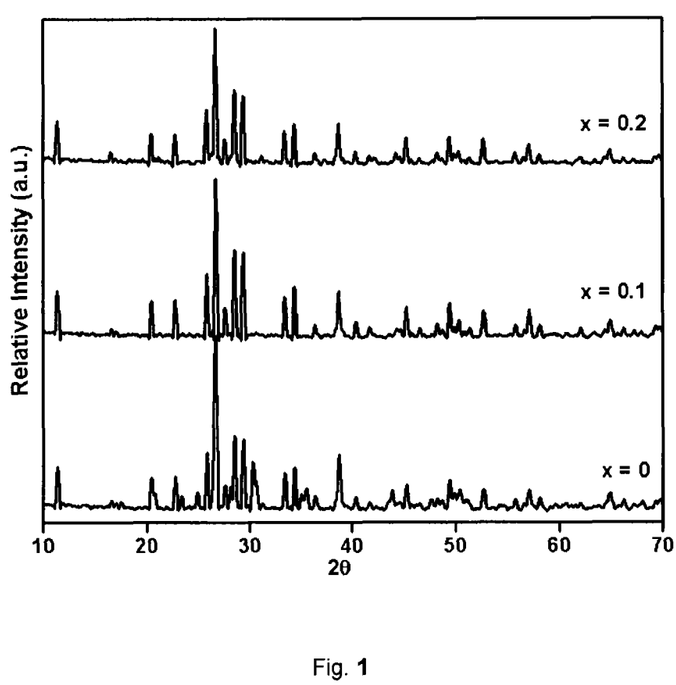
FIG. 1 is a graph illustrating the XRD patterns of $Sr_{1-x}La_xCu_{1-y}Li_ySi_4O_{10}$ (x=y and ranges from 0 to 0.2) pigments calcined 950° C./16 h.

The blue-coloured powder obtained has the following characteristics:

The XRD pattern can be indexed to tetragonal phase as depicted in FIG. 1.

Particle size analysis of the pigment $SrCuSi_4O_{10}$, reveals a mean diameter=2.27 micrometers (size of 90% particles <4.17 micrometers, 50% particles <2.00 micrometers and 10% particles <0.79 micrometers).

Figure 3:
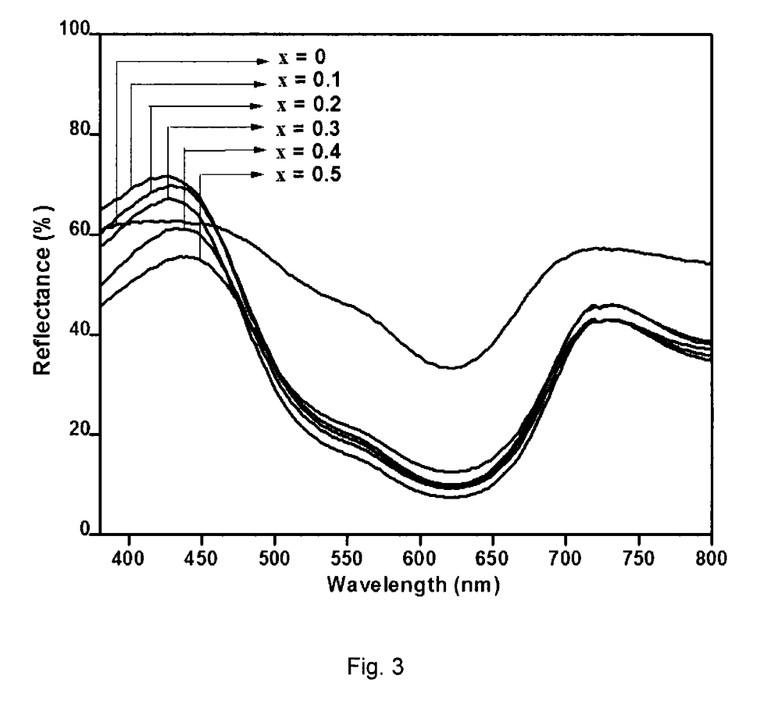
FIG. 3 is a graph illustrating the UV-vis diffuse reflectance spectra of $Sr_{1-x}La_xCu_{1-y}Li_ySi_4O_{10}$ x=y and ranges from 0 to 0.5) powder pigments.

The diffuse reflectance of the powder was measured with UV-vis spectrophotometer and is shown in FIG. 3. The chromaticity coordinates, determined by the CIE-Lab 1976 colour scales are L*=71.15, a*=−5.70, b*=−23.86.

Figure 4:
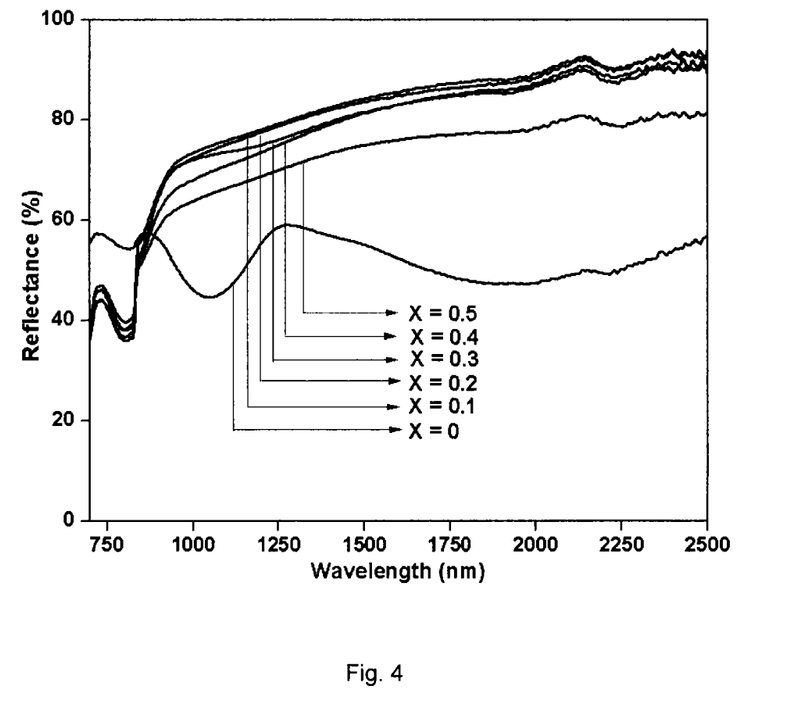
FIG. 4 is a graph illustrating the NIR reflectance spectra of $Sr_{1-x}La_xCu_{1-y}Li_ySi_4O_{10}$ (x=y and ranges from 0 to 0.5) pigment powders.

The near-infra-red reflectance of the powder was measured with UV-vis-NIR spectrophotometer and is depicted in FIG. 4. The NIR reflectance of the sample was found to be 53% at 1100 nm.

Example 2

This example illustrates the preparation of $La_{0.1}Sr_{0.9}Cu_{0.9}Li_{0.1}Si_4O_{10}$.

0.16 g of lanthanum oxide [$La_2O_3$; M=325.81], 1.33 g of strontium carbonate [$SrCO_3$; M=147.63], 0.72 g of copper oxide [CuO; M=79.54], 0.04 g of lithium carbonate [$Li_2CO_3$; M=73.89] and 2.41 g of silicon dioxide [$SiO_2$; M=60.14] were thoroughly mixed in the stoichiometric ratio in an agate mortar with a pestle. The mixture was calcined at 950° C. for 16 h in air atmosphere. The calcined mass was then grinded with mortar and pestle to reduce the particle size of the pigment.

The blue-coloured powder obtained has the following characteristics:

The XRD pattern can be indexed to tetragonal phase as depicted in FIG. 1.

Particle size analysis of the pigment $La_{0.1}Sr_{0.9}Cu_{0.9}Li_{0.1}Si_4O_{10}$, reveals a mean diameter=4.30 micrometers (size of 90% particles <8.76 micrometers, 50% particles <3.24 micrometers and 10% particles <0.97 micrometers).

The optical reflectance of the powder was measured and is shown in FIG. 3. The chromaticity coordinates significantly improved in the presence of lanthanum as compared to $SrCuSi_4O_{10}$.

The CIE-Lab 1976 colour scales are L*=55.71, a*=5.74, b*=−47.82.

The near-infra-red reflectance of the powder was measured and is shown in FIG. 4. The NIR reflectance of the sample was found to be 75% at 1100 nm.

Example 3

This example illustrates the preparation of $La_{0.2}Sr_{0.8}Cu_{0.8}Li_{0.2}Si_4O_{10}$.

0.33 g of lanthanum oxide [$La_2O_3$; M=325.81], 1.18 g of strontium carbonate [$SrCO_3$; M=147.63], 0.64 g of copper oxide [CuO; M=79.54], 0.07 g of lithium carbonate [$Li_2CO_3$; M=73.89] and 2.41 g silicon dioxide [$SiO_2$; M=60.14] were thoroughly mixed in the stoichiometric ratio in an agate mortar with a pestle. The mixture was calcined at 950° C. for 16 h in air atmosphere. The calcined mass was then grinded with mortar and pestle to reduce the particle size of the pigment.

The blue-coloured powder obtained has the following characteristics:

The XRD pattern can be indexed to Tetragonal phase as depicted in FIG. 1.

Particle size analysis of the pigment $La_{0.2}Sr_{0.8}Cu_{0.8}Li_{0.2}Si_4O_{10}$, reveals a mean diameter=3.57 micrometers (size of 90% particles <7.63 micrometers, 50% particles <2.74 micrometers and 10% particles <0.43 micrometers).

The optical reflectance of the powder in the region 380-700 was measured and is shown in FIG. 3. The chromaticity coordinates, determined by the CIE-Lab 1976 colour scales are L*=50.62, a*=9.23, b*=−51.47.

The near-infra-red reflectance of the powder was measured with UV-vis-NIR spectrophotometer and the results are displayed in FIG. 4. The NIR reflectance of the sample was found to be 76% at 1100 nm.

Example 4

This example illustrates the preparation of $La_{0.3}Sr_{0.7}Cu_{0.7}Li_{0.3}Si_4O_{10}$.

0.49 g of lanthanum oxide [$La_2O_3$; M=325.81], 1.03 g of strontium carbonate [$SrCO_3$; M=147.63], 0.56 g of copper oxide [CuO; M=79.54], 0.11 g of lithium carbonate [$Li_2CO_3$; M=73.89] and 2.41 g silicon dioxide [$SiO_2$; M=60.14] were thoroughly mixed in the stoichiometric ratio in an agate mortar with a pestle. The mixture was calcined at 950° C. for 16 h in air atmosphere. The calcined mass was then grinded with mortar and pestle to reduce the particle size of the pigment.

Figure 2:
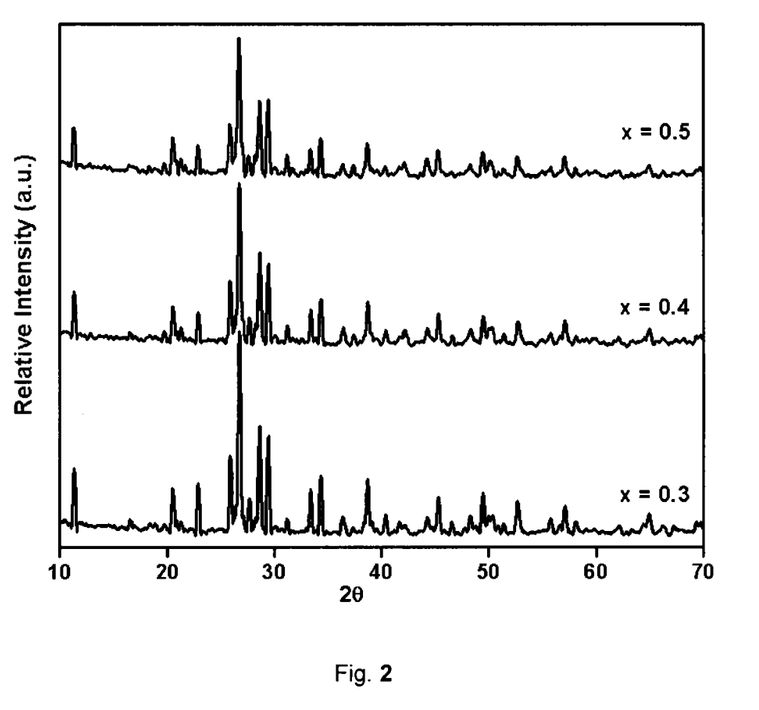
FIG. 2 is a graph illustrating the XRD patterns of $Sr_{1-x}La_xCu_{1-y}Li_ySi_4O_{10}$ (x=y and ranges from 0.3 to 0.5) pigments calcined 950° C./16 h.

The blue-coloured powder obtained has the following characteristics:

The XRD pattern can be indexed to Tetragonal phase as depicted in FIG. 2.

Particle size analysis of the pigment $La_{0.3}Sr_{0.7}Cu_{0.7}Li_{0.3}Si_4O_{10}$, reveals a mean diameter=4.12 micrometers (size of 90% particles <7.92 micrometers, 50% particles <3.59 micrometers and 10% particles <1.02 micrometers).

The diffuse reflectance of the powder in the region 380-700 nm was measured and is shown in FIG. 3. The remarkably high chromaticity coordinates are observed as compared to $SrCuSi_4O_{10}$. The CIE 1976 colour coordinates are $L^*=49.59$, $a^*=10.41$, $b^*=-51.74$.

The near-infra-red reflectance of the powder was measured is shown in FIG. 4. The NIR reflectance of the sample was found to be 77% at 1100 nm.

Figure 6:
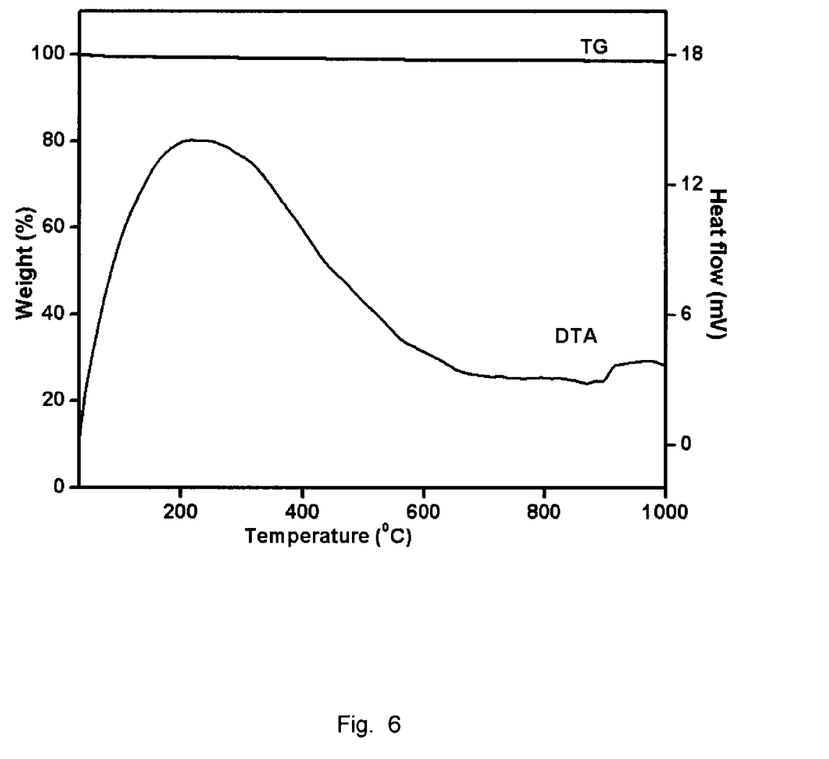
FIG. 6 is a graph illustrating the thermogram of $Sr_{0.7}La_{0.3}Cu_{0.7}Li_{0.3}Si_4O_{10}$.

Thermo-gravimetric analysis of the typical pigment $La_{0.3}Sr_{0.7}Cu_{0.7}Li_{0.3}Si_4O_{10}$ was carried out in the range 50-1000° C. and the results are displayed in FIG. 6. It is clear from the thermogram that the pigment is thermally stable up to 1000° C.

The typical pigment $La_{0.3}Sr_{0.7}Cu_{0.7}Li_{0.3}Si_4O_{10}$ was tested for its acid and alkali resistance. A pre-weighed amount of the pigment was treated with 10% $HCl/H_2SO_4/HNO_3$ and NaOH, and soaked for half an hour with constant stirring using a magnetic stirrer. The pigment powder was then filtered, washed with water, dried and weighed. Negligible weight loss was noticed for all the acids and alkali tested. The colour coordinates of the resultant tested samples were measured and compared with the untreated samples. The colour coordinate values after acid and alkali resistance tests were found to be ($L^*=49.63$, $a^*=10.41$, $b^*=-51.78$, $L^*=49.63$, $a^*=10.43$, $b^*=-51.57$ for NaOH and HCl, respectively) same as that of pigment powder sample. Thus the designed blue pigments are found to be chemically and thermally stable.

Example 5

This example illustrates the preparation of $La_{0.4}Sr_{0.6}Cu_{0.6}Li_{0.4}Si_4O_{10}$.

0.65 g of lanthanum oxide [$La_2O_3$; M=325.81], 0.88 g of strontium carbonate [$SrCO_3$; M=147.63], 0.48 g of copper oxide [CuO; M=79.54], 0.15 g of lithium carbonate [$Li_2CO_3$; M=73.89] and 2.41 g silicon dioxide [$SiO_2$; M=60.14] were thoroughly mixed in the stoichiometric ratio in an agate mortar with a pestle. The mixture was calcined at 950° C. for 16 h in air atmosphere. The calcined mass was then grinded with mortar and pestle to reduce the particle size of the pigment.

The blue-coloured powder obtained has the following characteristics:

The XRD pattern can be indexed to Tetragonal phase as depicted in FIG. 2.

Particle size analysis of the pigment $La_{0.4}Sr_{0.6}Cu_{0.6}Li_{0.4}Si_4O_{10}$, reveals a mean diameter=4.86 micrometers (size of 90% particles <8.85 micrometers, 50% particles <4.66 micrometers and 10% particles <1.23 micrometers).

The optical reflectance of the powder was measured and is shown in FIG. 3. The chromaticity coordinates, determined by the CIE-Lab 1976 colour scales are $L^*=52.99$, $a^*=4.12$, $b^*=-45.17$.

The near-infra-red reflectance of the powder was measured and is shown in FIG. 4. The NIR reflectance of the sample was found to be 75% at 1100 nm.

Example 6

This example illustrates the preparation of $La_{0.5}Sr_{0.5}Cu_{0.5}Li_{0.5}Si_4O_{10}$.

0.81 g of lanthanum oxide [$La_2O_3$; M=325.81], 0.74 g of strontium carbonate [$SrCO_3$; M=147.63], 0.40 g of copper oxide [CuO; M=79.54], 0.18 g of lithium carbonate [$Li_2CO_3$; M=73.89] and 2.41 g silicon dioxide [$SiO_2$; M=60.14] were thoroughly mixed in the stoichiometric ratio in an agate mortar with a pestle. The mixture was calcined at 950° C. for 16 hrs in air atmosphere. The calcined mass was then grinded with mortar and pestle to reduce the particle size of the pigment.

The blue-coloured powder obtained has the following characteristics:

The XRD pattern can be indexed to tetragonal phase as depicted in FIG. 2.

Particle size analysis of the pigment $La_{0.5}Sr_{0.5}Cu_{0.5}Li_{0.5}Si_4O_{10}$, reveals a mean diameter=5.42 micrometers (size of 90% particles <9.92 micrometers, 50% particles <5.14 micrometers and 10% particles <1.32 micrometers).

The optical reflectance of the powder in the visible region was measured and is shown in FIG. 3. The chromaticity coordinates, determined by the CIE-Lab 1976 colour scales are $L^*=55.64$, $a^*=1.53$, $b^*=-39.47$.

The near-infra-red reflectance of the powder was measured and is shown in FIG. 4. The NIR reflectance of the sample was found to be 73% at 1100 nm.

Example 7

This example is intended to illustrate the suitability of the pigments according to the invention for colouring of plastics by using a polymer substrate like poly methyl methacrylate (PMMA; Sigma Aldrich). 5 weight % of the typical pigment sample, $La_{0.3}Sr_{0.7}Cu_{0.7}Li_{0.3}Si_4O_{10}$ (as illustrated in example 4), and 95 weight % of poly methyl methacrylate, (PMMA) (supplied by Sigma Aldrich) was dispersed in a Cold Curing Liquid (Acralyn 'R', supplied by M/s Asian Acrylates, Mumbai) and the resultant mixture was ultrasonicated (Vibronics, 250V, India) for 10 min to ensure complete dispersion of the pigment particles. Then the pigment dispersion was slowly evaporated at 30° C. and converted in to a thick paste. The paste after 2 h of curing was compressed uniaxially into cylindrical discs using Hydraulic press (Lawrence and Maya, India) at a pressure of 25 MPa. Both sides of the pigmented polymer were lapped using a fine grade emery sheet for obtaining a polished surface. Optical reflectance of the prepared pigmented surface was measured using barium sulphate as reference. The obtained substrate material had a blue hue and has the CIE 1976 chromaticity coordinates: $L^*=28.43$, $a^*=14.92$, $b^*=-48.57$.

Thermogravimetric analysis of the typical coloured material was carried out in the temperature range of 50-500° C. It is clear from the thermogravimetric analysis that the coloured substrate material is found to be thermally stable up to 225° C.

Example 8

This example illustrates preparation of blue coloured NIR reflecting coatings on a building material like concrete cement slab. The coating was done in a two-step process. In the first step, the concrete cement surface was coated with an inexpensive white pigment $TiO_2$, possessing high NIR reflectance. In the second step the designed typical pigment is applied to the pre-coated concrete material. The pigment samples were ground and sieved under 35 micrometers mesh size and was ultrasonicated (Vibronics, 250 W, India) for 10 min to ensure the complete dispersion of the pigment particles in an acrylic-acralyn emulsion. The pigment to binder ratio was maintained as 1:1 by weight. DPI-RR Cold Cure Polymer Resin powder (supplied by M/s Dental Products of India, Mumbai, India) was employed as a binder. Cold Curing Liquid (Acralyn 'R', supplied by M/s Asian Acrylates, Mumbai) was used as a dispersing medium. The resultant viscous solution was coated on the concrete cement slab surface and was allowed to dry in air. The thickness of the pigment coating on concrete cement slab was measured using LEICA DMRX optical microscope. The thickness of the coating is found to be 170 micrometers.

Figure 5:
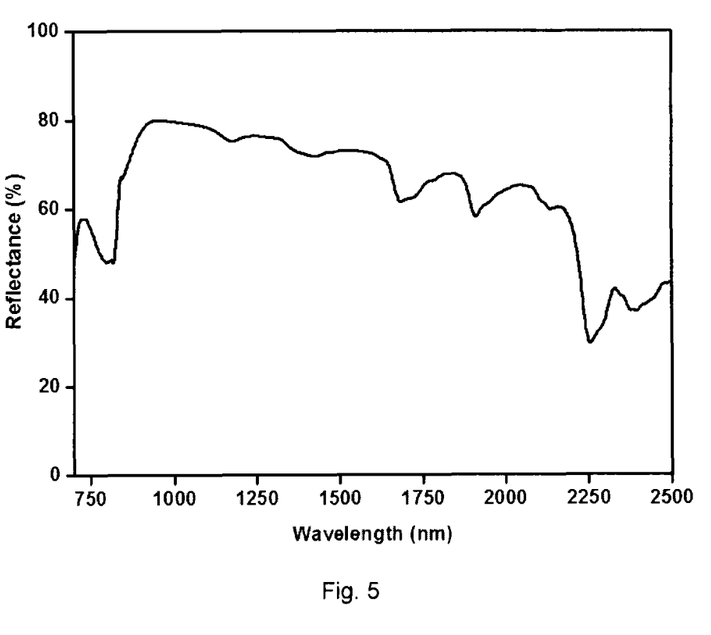
FIG. 5 is a graph illustrating the NIR reflectance spectrum of $La_{0.3}Sr_{0.7}Cu_{0.7}Li_{0.3}Si_4O_{10}$ blue pigment coated over a $TiO_2$ base coat on a concrete cement slab.

The near infra-red reflectance of the concrete slab was measured with UV-vis-NIR spectrophotometer and is shown in FIG. 5. The NIR reflectance of the sample was found to be 78% at 1100 nm.

The chromaticity coordinates, of the test piece was measured at different locations and an average value was found to be $L^*=51.38$, $a^*=4.83$, $b^*=-44.53$. The light resistance of the coated concrete surface was tested by exposing it to sunlight at various time intervals and measured the colour coordinates. The $L^*$, $a^*$ and $b^*$ values ($L^*=51.51$, $a^*=4.67$, $b^*=-44.39$, after 12 h; $L^*=51.74$, $a^*=4.25$, $b^*=-44.19$, after 48 h; $L^*=51.91$, $a^*=3.88$, $b^*=-44.07$, after 60 h) were same as that of the unexposed sample.

Advantages of the Invention

1. The pigments are toxic metal free.
2. The pigments are prepared by simple calcination route in air atmosphere.
3. The pigments possess richness of the blue colour as compared to the existing blue pigments.
4. Multifunctional pigment: Visibly it displays strong blue colour and high NIR reflectance, which may be useful in reducing the inside building temperature after coating onto building roofing and thus energy saving materials.

We claim:
1. A blue inorganic pigment represented by the general formula $La_xSr_{1-x}Cu_{1-y}Li_ySi_4O_{10}$ wherein x is equal to 0.1 to 0.5 and y is equal to 0.1 to 0.5, wherein the pigment comprises an average particle size of 2 to 6 micrometers, wherein said pigment is having reflectance at near infra-red wavelength.

2. The pigment as claimed in claim 1, wherein a representative pigment is represented by following chromaticity coordinates as per the CIE 1976 colour system:
   a. $La_{0.1}Sr_{0.9}Cu_{0.9}Li_{0.1}Si_4O_{10}$, $L^*=55.71$, $a^*=5.74$, $b^*=-47.82$;
   b. $La_{0.2}Sr_{0.8}Cu_{0.8}Li_{0.2}Si_4O_{10}$, $L^*=50.62$, $a^*=9.23$, $b^*=-51.47$;
   c. $La_{0.3}Sr_{0.8}Cu_{0.7}Li_{0.3}Si_4O_{10}$, $L^*=49.59$, $a^*=10.41$, $b^*=-51.74$;
   d. $La_{0.4}Sr_{0.6}Cu_{0.6}Li_{0.4}Si_4O_{10}$, $L^*=52.99$, $a^*=4.12$, $b^*=-45.17$;
   e. $La_{0.9}Sr_{0.5}Cu_{0.5}Li_{0.5}Si_4O_{10}$, $L^*=55.64$, $a^*=1.53$, $b^*=-39.47$.

3. The pigments as claimed in claim 1, wherein the pigment is composed of mainly phase pure crystalline compounds.

4. The pigments as claimed in claim 1, wherein the pigment is useful as a colourant for substrate materials selected from the group consisting of cement slabs, concrete slabs, roofing materials, plastics, paints and other polymers.

5. The pigment as claimed in claim 1, wherein the pigment exhibits near infra-red wavelength (NIR reflectance) in the range of 75 to 77% at 1100 nm wavelength which is higher in comparison with visible reflectance at visible wavelength in the range of 40 to 60% at 725 nm wavelength.

6. A process for preparing a blue inorganic pigment as claimed in claim 1, wherein the process comprises:
   mixing one part of stoichiometric mixture of lanthanum oxide and strontium carbonate in a stoichiometric ratio of x:1−x, one part of stoichiometric mixture of copper oxide and lithium carbonate in a stoichiometric ratio of 1−y:y and four parts of silicon dioxide together to obtain a solid mixture;
   and calcining the solid mixture at a temperature in the range of 950°-1000° C. in air atmosphere for a period ranging between 16 to 20 h to obtain the blue inorganic pigment.

7. A process for colouring a polymer substrate using the pigments as claimed in claim 1, wherein the process steps comprises: adding the pigment in the range of 5 to 10% by weight of the pigment to 90-95% of the polymer substrate dispersed in a cold curing liquid, sonicating for 10-15 min and drying at a temperature ranging between 28-35° C. followed by compressing the resultant paste uniaxially into desired shapes at a pressure ranging between 25 to 30 MPa.

8. A process as claimed in claim 7, wherein the polymer substrate used is poly methyl methacrylate (PMMA).

9. A process for coating of a building roofing material selected from the group consisting of a cement slab and a concrete slab, wherein the process comprises:
   (i) coating the building roofing material with white pigment $TiO_2$, possessing high NIR reflectance,
   (ii) preparing the complete dispersion of the pigment as claimed in claim 1 in acrylic-acralyn emulsion having pigment to binder ratio in the range of 1:1 by weight;
   (iii) coating the building roofing material of step (i) with the emulsion prepared in step (ii) and drying the coated building roofing material at a temperature ranging between 28-35° C. to obtain a coated building roofing material having a thickness of coating in the range of 150 to 180 micrometers, exhibiting reflectance 78% at 1100 nm.

* * * * *